United States Patent
Arakawa et al.

(10) Patent No.: US 10,411,568 B2
(45) Date of Patent: Sep. 10, 2019

(54) METHOD OF MANUFACTURING LAMINATED CORE

(71) Applicants: Mitsui High-tec, Inc., Yahatanishi-ku, Kitakyushu-shi, Fukuoka (JP); TOYOTA JIDOSHA KABUSHIKI KAISHA, Toyota-shi, Aichi (JP)

(72) Inventors: Hirokazu Arakawa, Kitakyushu (JP); Go Kato, Kitakyushu (JP); Syo Yamaguchi, Kitakyushu (JP); Shinya Sano, Toyota (JP)

(73) Assignees: Mitsui High-tec, Inc., Yahatanishi-ku, Kitakyushu-shi, Fukuoka (JP); TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 191 days.

(21) Appl. No.: 15/598,801

(22) Filed: May 18, 2017

(65) Prior Publication Data

US 2017/0338724 A1 Nov. 23, 2017

(30) Foreign Application Priority Data

May 19, 2016 (JP) .................... 2016-100643

(51) Int. Cl.
*H02K 15/00* (2006.01)
*H02K 15/02* (2006.01)
*H02K 1/14* (2006.01)

(52) U.S. Cl.
CPC ........... *H02K 15/022* (2013.01); *H02K 1/146* (2013.01); *Y10T 29/49009* (2015.01)

(58) Field of Classification Search
CPC ........ H02K 15/022; H02K 1/16; H02K 1/146; B21D 28/02; Y10T 29/49009; Y10T 29/53789; Y10T 29/534
USPC .............. 29/596, 598; 310/216.004, 216.005
See application file for complete search history.

(56) References Cited

U.S. PATENT DOCUMENTS

| | | | | |
|---|---|---|---|---|
| 3,650,167 | A * | 3/1972 | Hoffmeyer | H02K 1/16 29/596 |
| 5,799,387 | A * | 9/1998 | Neuenschwander | B21D 28/02 29/598 |
| 7,531,936 | B2 * | 5/2009 | Fukasaku | H02K 1/16 310/216.005 |

(Continued)

FOREIGN PATENT DOCUMENTS

| | | |
|---|---|---|
| CN | 102195417 A | 9/2011 |
| CN | 102428627 A | 4/2012 |
| JP | 2013-013189 | 1/2013 |

*Primary Examiner* — Donghai D Nguyen
(74) *Attorney, Agent, or Firm* — Procopio, Cory, Hargreaves & Savitch LLP

(57) ABSTRACT

A method of manufacturing a laminated stator core includes: blanking an electrical steel sheet at 1st to Nth (N is a natural number equal to or greater than 2) positions arranged in the width direction of the electrical steel sheet to form 1st to Nth blank members, and laminating the 1st to Nth blank members to form a laminated stator core. The shape or arrangement of at least one odd-shaped part of a plurality of odd-shaped parts in the kth (k is a natural number of 1 to N) blank member differs from the shape or arrangement of at least one odd-shaped part of a plurality of odd-shaped parts in the mth (m is a natural number of 1 to N and satisfying m≠k) blank member such that the shapes of given two blank members do not agree with each other.

16 Claims, 12 Drawing Sheets

(56) References Cited

U.S. PATENT DOCUMENTS 8,916,254 B2 *  12/2014  Nagai .................. H02K 1/16
                                                310/216.004
2012/0058313 A1  3/2012  Nagai et al.

* cited by examiner

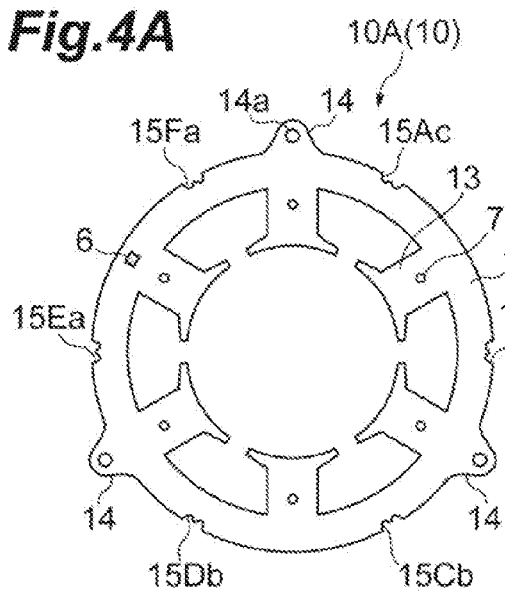
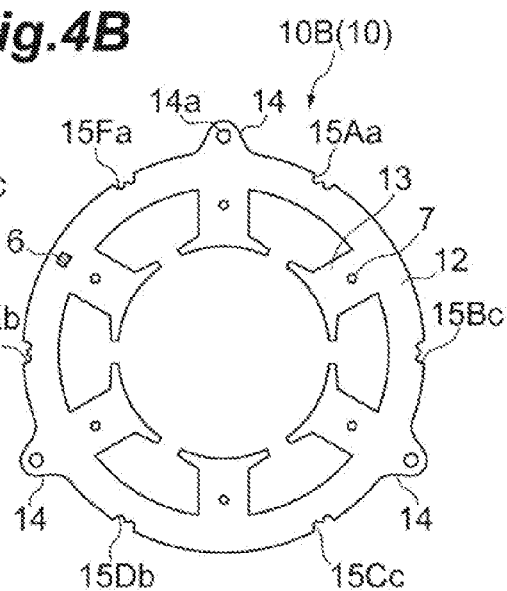
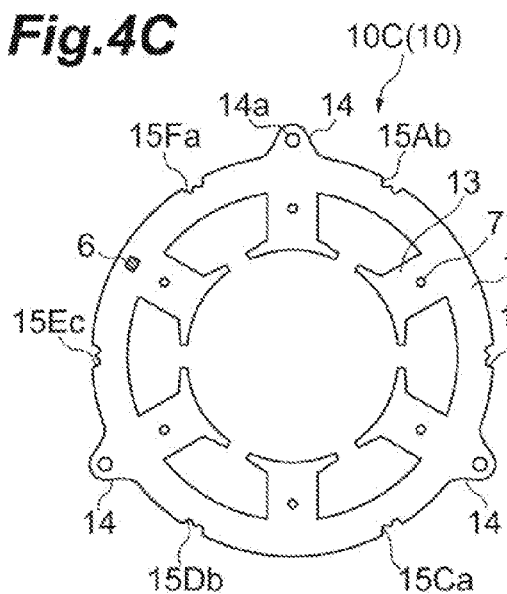
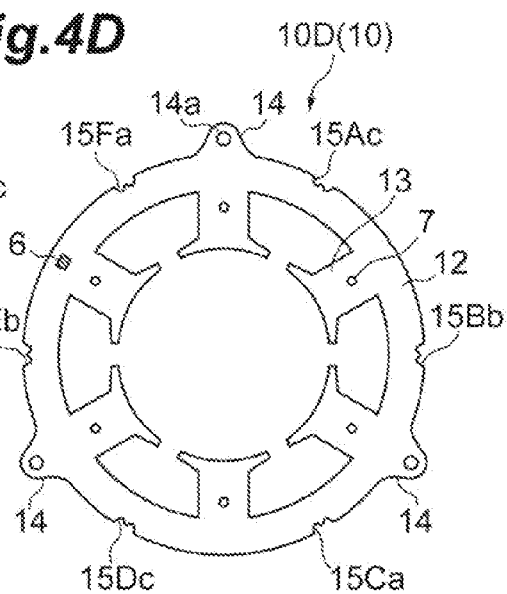

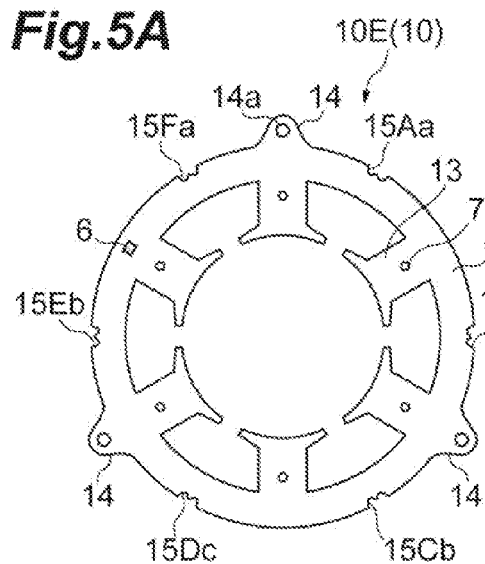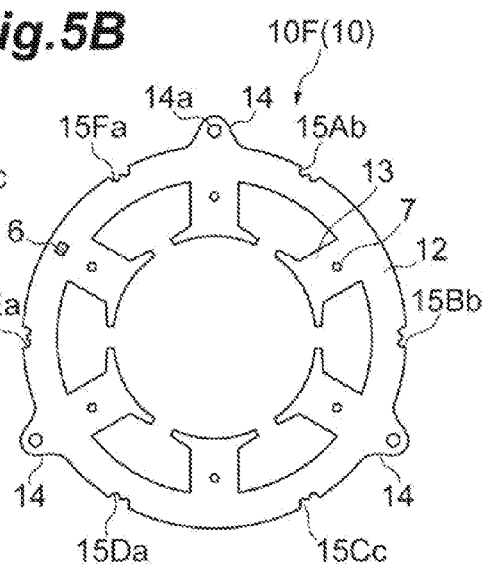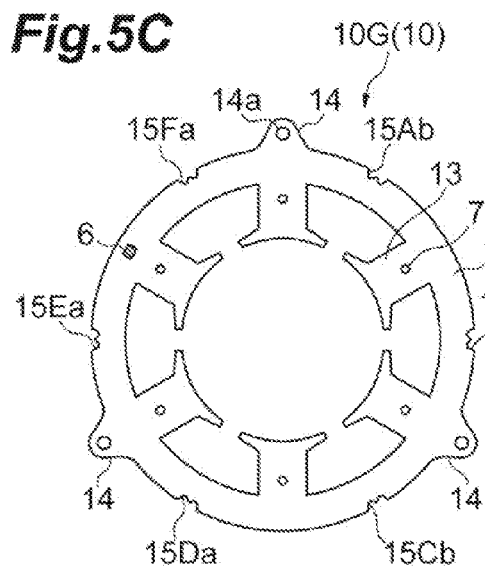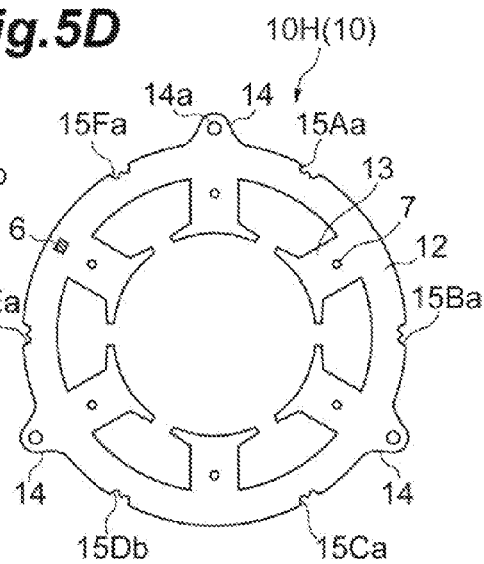

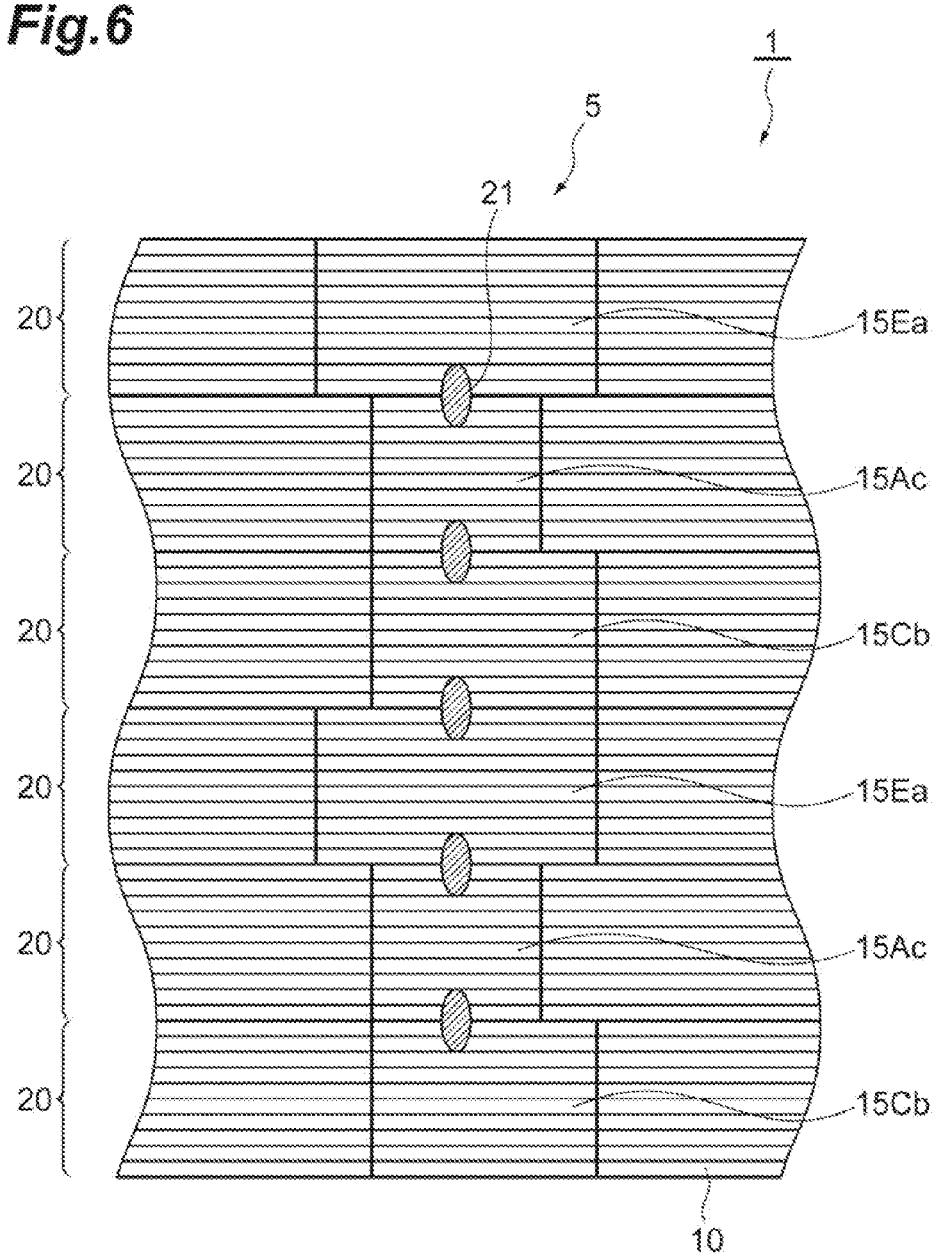

METHOD OF MANUFACTURING LAMINATED CORE

CROSS-REFERENCE TO RELATED APPLICATIONS

This application is based upon and claims the benefit of priority from Japanese Patent Application No. 2016-100643, filed May 19, 2016, the entire contents of which are incorporated herein by reference.

BACKGROUND

1. Field

The present disclosure relates to a method of manufacturing a laminated core.

2. Disclosure of the Related Art

Japanese Unexamined Patent Publication No. 2013-013189 discloses a method of manufacturing a laminated core, including a first step of blanking a metal sheet with a punch while progressively feeding a coil material, which is a strip-shaped metal sheet (workpiece plate) wound in the shape of a coil, from an uncoiler intermittently at predetermined pitches to form a plurality of blank members in the width direction of the metal sheet, a second step of laminating the blank members to form split core pieces, and a third step of assembling the split core pieces to obtain a ring-shaped laminated core. In the first step, an identification mark is formed at different places of the blank members, depending on the position in the width direction (width position) of the metal sheet, in order to identify at which position in the width direction of the metal sheet the blank member is blanked. With this configuration, even when a defect is found in a blank member after formation of the split core pieces or after formation of the laminated core, it is possible to specify at which position in the width direction of the metal sheet the blank member is cut out.

SUMMARY

A method of manufacturing a laminated core according to an aspect of the present disclosure includes: blanking a strip-shaped metal sheet along predetermined $1^{st}$ to $N^{th}$ (N is a natural number of at least 2) blank shapes at $1^{st}$ to $N^{th}$ positions arranged in a row in a width direction of the metal sheet to form $1^4$ to $N^{th}$ blank members corresponding to the $1^4$ to $N^{th}$ blank shapes, respectively; and laminating the blank members to form a laminate. The $1^{st}$ to $N^{th}$ blank members each have a plurality of odd-shaped parts having at least one of a recessed shape and a projecting shape at a position overlapping each other when the blank members are laminated in the step of laminating. At least one of shape and arrangement of at least one odd-shaped part of the odd-shaped parts in the $k^{th}$ (k is a natural number of 1 to N) blank member differs from at least one of shape and arrangement of at least one odd-shaped part of the odd-shaped parts in the $m^{th}$ (m is a natural number of 1 to N and satisfying m≠k) blank member such that a shape of the $k^{th}$ blank member and a shape of the $m^{th}$ blank member do not agree with each other.

BRIEF DESCRIPTION OF THE DRAWINGS

FIG. 4A to FIG. 4D are diagrams showing examples of the layout of the odd-shaped parts in the blank member.

FIG. 5A to FIG. 5B are diagrams showing examples of the layout of the odd shaped parts in the blank member.

FIG. 6 is a side view mainly showing an example of the odd-shaped parts of the laminated stator core.

DETAILED DESCRIPTION

Figure 1:
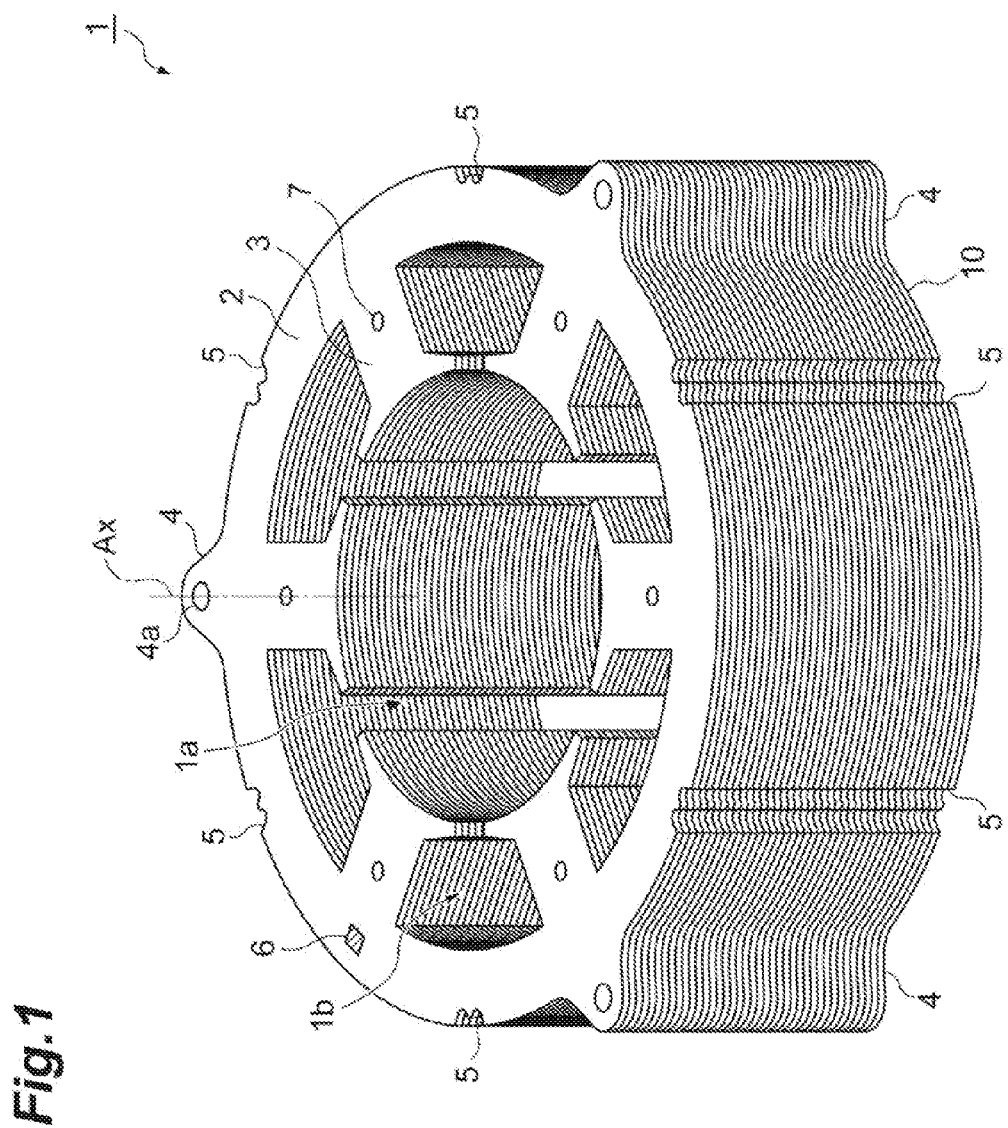
FIG. 1 is a perspective view showing an example of a laminated stator core.

Embodiments according to the present disclosure described below are by way of illustration for explaining the present invention, and the present invention should not be limited to the contents below.

Embodiment Overview (1) A method of manufacturing a laminated core according to an example of the present embodiment includes a first step of blanking a strip-shaped metal sheet along predetermined $1^{st}$ to $N^{th}$ (N is a natural number equal to or greater than 2) blank shapes at $1^{st}$ to $N^{th}$ positions arranged in a row in a width direction of the metal sheet to form $1^{st}$ to $N^{th}$ blank members corresponding to the $1^{st}$ to $N^{th}$ blank shapes, respectively, and a second step of laminating the blank members to form a laminate. The $1^{st}$ to $N^{th}$ blank members each have a plurality of odd-shaped parts having a recessed shape or a projecting shape at a position overlapping each other when the blank members are laminated in the second step. The shape or arrangement of at least one odd-shaped part of the odd-shaped parts in the $k^{th}$ (k is a natural number of 1 to N) blank member differs from the shape or arrangement of at least one odd-shaped part of the odd-shaped parts in the $m^{th}$ (m is a natural number of 1 to N and satisfying m≠k) blank member such that the shape of the $k^{th}$ blank member and the shape of the $m^{th}$ blank member do not agree with each other.

In the method of manufacturing a laminated core according to an example of the present embodiment, the $1^{st}$ to $N^{th}$ blank members cut out from the metal sheet in the first step each have a plurality of odd-shaped parts having a recessed shape or a projecting shape at a position overlapping each other when the blank members are laminated in the second step. The shape or arrangement of at least one odd-shaped part of a plurality of odd-shaped parts in the $k^{th}$ blank member differs from the shape or arrangement of at least one odd-shaped part of a plurality of odd-shaped parts in the $m^{th}$ blank member such that the shape of the $k^{th}$ blank member and the shape of the $m^{th}$ blank member do not agree with each other. Thus, since the shapes of the blank members cut out at the $1^{st}$ to $N^{th}$ positions in the width direction of the metal sheet are different from each other, it is possible to specify at which position of the 1$^{st}$ to N$^{th}$ positions a given blank member is cut out. Here, various odd-shaped parts may be formed in the blank members for convenience of manufacturing a laminated core. In the method of manufacturing a laminated core according to an example of the present embodiment, the shape of the k$^{th}$ blank member and the shape of the m$^{th}$ blank member are distinguished from each other by the shape or arrangement of such odd-shaped parts. This enables identification of different blank members from each other using existing punches, dies, and the like for forming odd-shaped parts and therefore eliminates the need for installing new punches, dies, and the like for identifying the blank members. With the configuration as described above, it is possible to specify at which position in the width direction of the metal sheet the respective blank members are cut out, while complication of the device is suppressed.

(2) In the method according to the section (1), the odd-shaped part may be formed at each of peripheral edges of the 1$^{st}$ to N$^{th}$ blank members and may be a welded part for welding the blank members together, a fitting part to be fitted to a die during blanking of the blank member from the metal sheet, or a rotational lamination identifying part for identifying rotational lamination. When the odd-shaped part is a welded part, the odd-shaped part can have two functions in combination, namely, the function of identifying the blanking position of the blank member and the welding function. When the odd-shaped part is a fitting part, the odd-shaped part can have two functions in combination, namely, the function of identifying, the blanking position of the blank member and the fitting function. When the odd-shaped part is a rotational lamination identifying part, the odd-shaped part can have two functions in combination, namely, the function of identifying the blanking position of the blank member and the identification function of identifying the rotational lamination state.

(3) In the method according to the section (1) or (2), the blank member may have a ring shape.

(4) In the method according to any one of the sections (1) to (3), in the second step, the blank members or blocks each formed by laminating a predetermined number of blank members may be rotationally laminated to form the laminate.

(5) In the method according to any one of the sections (1) to (4), in the first step, an identification mark for identifying the front and the back of the blank member is formed. In this case, even if the shapes of different two blank members agree with each other when front and back are reversed, it is possible to specify at which position in the metal sheet these blank members are cut out. This can increase the number of patterns of shapes of blank members without overlap, using the identification mark in addition to the kinds of shapes of the odd-shaped parts.

Illustration of Embodiment

An example of embodiments according to the present disclosure will be described in more details below with reference to the drawings. In the following description, the same elements or the elements having the same functions are denoted with the same signs and an overlapping description thereof will be omitted.

[Laminated Stator Core]

Referring first to FIG. 1, the configuration of a laminated stator core 1 will be described. The laminated stator core 1 (stator) has a cylindrical shape. That is, the laminated stator core 1 has a through hole 1a extending along the center axis Ax at its central portion. In the through hole 1a, a not-shown laminated rotor core (rotor) can be disposed. The laminated stator core 1 constitutes a motor together with the laminated rotor core.

The laminated stator core 1 is a laminate in which a plurality of blank members 10 are stacked. The laminated stator core 1 has a yoke part 2, a plurality of tooth parts 3 (six tooth parts 3 in FIG. 1), and a plurality of tug parts 4 (three lug parts 4 in FIG. 1).

The yoke part 2 has an annular shape and extends so as to surround the center axis Ax. The width of the yoke part 2 in the radial direction, the inner diameter of the yoke part 2, the outer diameter of the yoke part 2, and the thickness of the yoke part 2 can be set to various sizes depending on the application and performance of the motor.

At the outer peripheral edge of the yoke part 2, a plurality of odd-shaped parts 5 (six odd-shaped parts in FIG. 1) are provided. Each odd-shaped part 5 is depressed toward the center axis Ax. The cold-shaped parts 5 are arranged at approximately regular intervals in the circumferential direction of the yoke part 2 (hereinafter simply referred to as "circumferential direction"). Each odd-shaped part 5 extends linearly from one end surface toward the other end surface of the laminated stator core 1 in the lamination direction of the laminated stator core 1 (hereinafter simply referred to as "lamination direction").

An identification mark 6 is formed on the front surface of the yoke part 2. The identification mark 6 functions as a mark for identifying the front surface of the yoke part 2. The identification mark 6 is a character, graphics, or the like printed, for example, with a laser marker. On the back surface of the yoke part 2, any mark may not be formed or a mark different from the identification mark 6 may be formed. This enables distinction between the front surface and the back surface of the blank member 10.

Each tooth part 3 extends along the radial direction of the laminated stator core 1 (hereinafter simply referred to as "radial direction") from the inner edge of the yoke part 2 toward the center axis Ax. In the laminated stator core 1 shown in FIG. 1, the tooth parts 3 are formed integrally with the yoke part 2.

The tooth parts 3 are arranged at approximately regular intervals in the circumferential direction. The width of each tooth part 3 in the circumferential direction, the length of each tooth part 3 in the radial direction, the distance between adjacent tooth parts 3, and the thickness of each tooth part 3 can be set to various sizes depending on the application and performance of the motor.

When the laminated stator core 1 is constructed as a motor, winding (not shown) is wound around each tooth part 3 with predetermined turns. A slot 1b, which is a space for disposing winding, is defined between adjacent tooth parts 3. Each tooth part 3 has a swaged area 7. The swaged area 7 joins adjacent blank members 10 together in the lamination direction.

Each lug part 4 protrudes from the outer edge of the yoke part 2 outward in the radial direction away from the center axis Ax. The lug parts 4 are arranged at approximately regular intervals in the circumferential direction. Each lug part 4 extends linearly in the lamination direction from one end surface toward the other end surface of the laminated stator core 1.

Each lug part 4 has a through hole 4a passing through the lug part 4 in the lamination direction. The through hole 4a functions as a bolt insertion hole for fixing the laminated stator core 1 to the housing of the motor (not shown).

Figure 2:
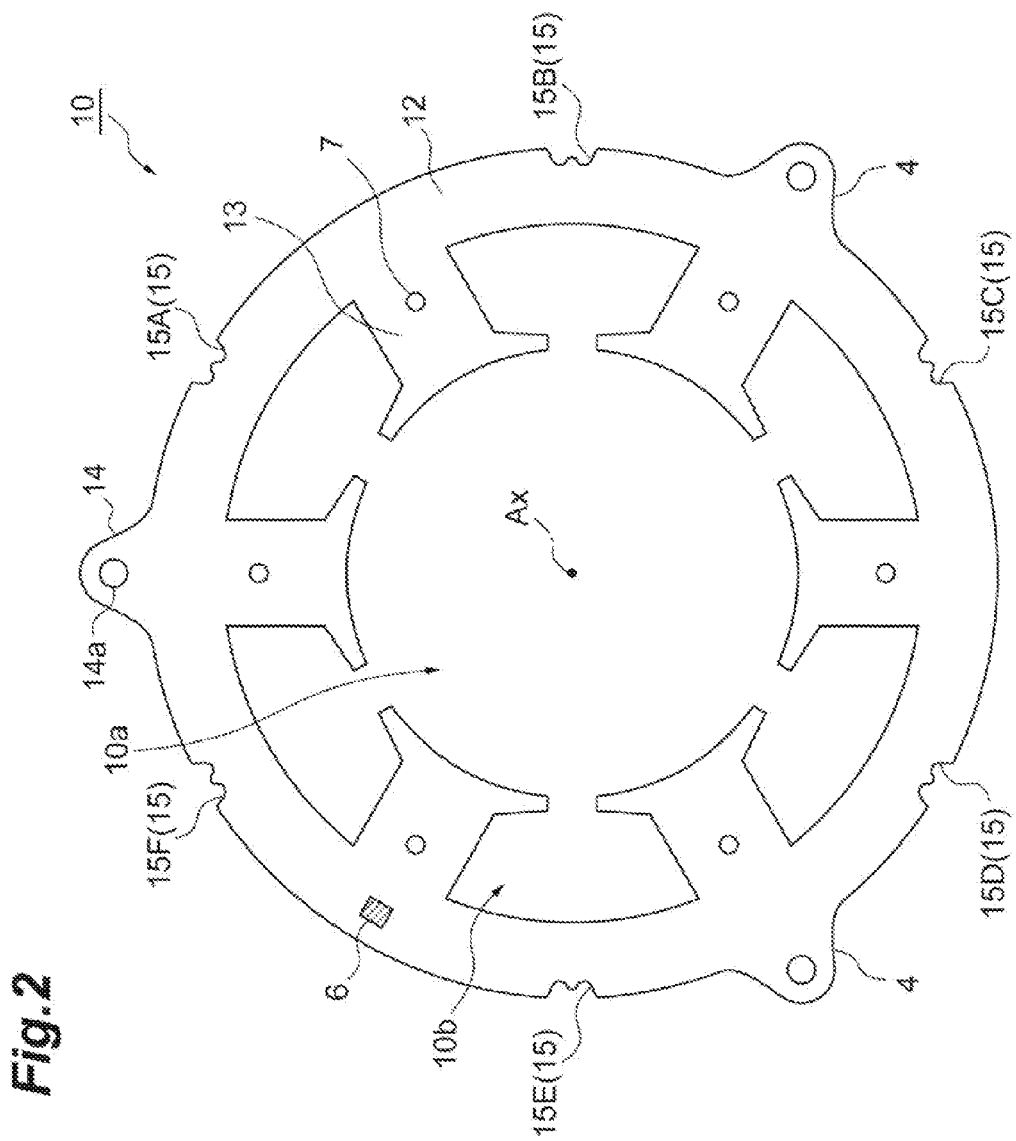
FIG. 2 is a top view showing an example of a blank member.

The blank member 10 is obtained, for example, by working (for example, blanking, lancing) an electrical steel sheet W (see FIG. 6 to FIG. 9). When the blank member 10 does not have a temporary inter-locking part, the shape of the blank member 10 as viewed from the center axis Ax direction is approximately the same as the shape of the laminated stator core 1 as viewed from the center axis Ax direction (see FIG. 1 and FIG. 2). The blank member 10 therefore also has an annular shape as viewed from the center axis Ax direction, as shown in FIG. 2. A through hole 10a is provided at the central portion of the blank member 10.

The blank member 10 has a yoke part 12, a plurality of tooth parts 13 (six tooth parts 13 in FIG. 2), and a plurality of lug parts 14 (three lug parts 14 in FIG. 1). The yoke part 12, the tooth part 13, and the lug part 14 correspond to the yoke part 2, the tooth part 3, and the lug part 4, respectively, of the laminated stator core 1. The shapes of the yoke part 12, the tooth part 13, and the lug part 14 are therefore the substantially same as the yoke part 2, the tooth part 3, and the lug part 4, respectively, of the laminated stator core 1. That is, when the blank members 10 are laminated to form the laminated stator core 1, the yoke parts 12 of the blank members 10 serve as the yoke part 2 of the laminated stator core 1, the tooth parts 13 of the blank members 10 serve as the tooth part 3 of the laminated stator core 1, and the lug parts 14 of the blank members 10 serve as the lug part 4 of the laminated stator core 1.

A plurality of odd-shaped parts 15 (six odd-shaped parts 15A to 15F in FIG. 2) are provided on the outer peripheral edge of the yoke part 12. Each odd-shaped part 15 is depressed toward the center axis Ax. The odd-shaped parts 15 are arranged at approximately regular intervals in the circumferential direction of the yoke part 12. In FIG. 2, the odd-shaped parts 15A to 15F are arranged clockwise in this order as viewed from above. The identification mark 6 is formed on the front surface of the yoke part 12.

A slot 10b, which is a space for disposing winding, is defined between adjacent tooth parts 13. The lug part 14 has a through hole 14a passing through the lug part 14 in the center axis Ax direction.

Here, the odd-shaped part 15 has one shape selected from a plurality of kinds different from each other. For example, the odd-shaped part 15 may be of any one of three kinds of shapes a to c shown in FIGS. 3A to 3C. Thus, in the blank member 10 shown in FIG. 2, the odd-shaped parts 15A to 15F may have three shapes a to c.

Figure 3A:
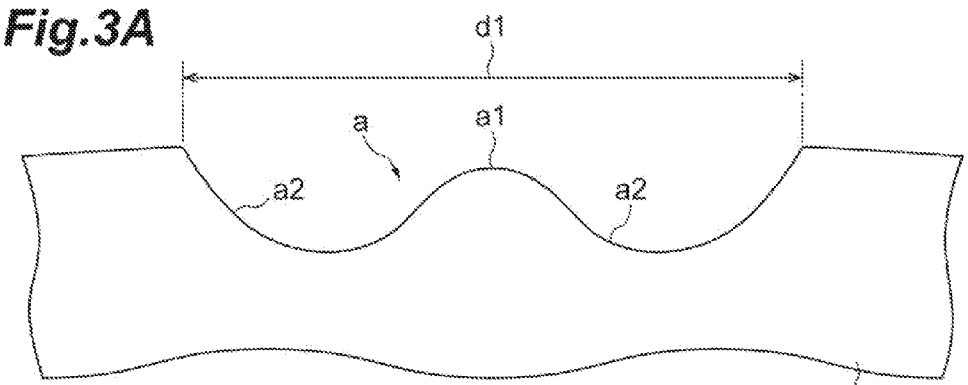
FIG. 3A to FIG. 3C are schematic diagrams showing examples of the shape of an odd-shaped part.

The shape a is a notch formed with a projecting portion a1 and a pair of recessed portions a2 as shown in FIG. 3A. The projecting portion a1 has an arc shape protruding toward the side distant from the center axis Ax (radially outside of the blank member 10). A pair of recessed portions a2 have an arc shape depressed toward the center axis Ax and are positioned on both sides of the projecting portion a1. The inner ends of a pair of recessed portions a2 are coupled to the ends of the projecting portion a1. The outer ends of a pair of recessed portions a2 are coupled to the outer peripheral edge of the blank member 10.

Figure 3B:
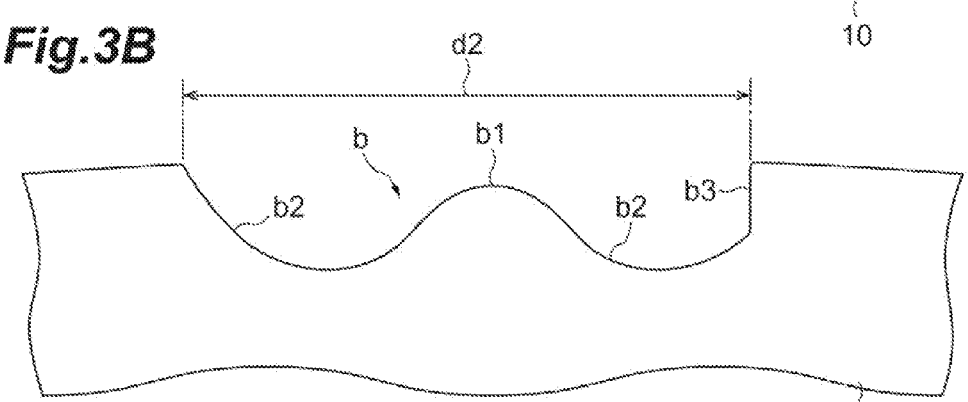

The shape b is a notch formed with a projecting portion b1, a pair of recessed portions b2, and a linear portion b3, as shown in FIG. 3B. The projecting portion b1 has an arc shape protruding toward the side distant from the center axis Ax (radially outside of the blank member 10). A pair of recessed portions b2 have an arc shape depressed toward the center axis Ax and are positioned on both sides of the projecting portion b1. The inner ends of a pair of recessed portions b2 are coupled to the ends of the projecting portion b1. The outer end of one of the recessed portions b2 is coupled to the outer peripheral edge of the blank member 10. The linear portion b3 linearly extends along the radial direction of the blank member 10. The linear portion b3 couples the outer end of the other projecting portion b2 with the outer peripheral edge of the blank member 10. The opening width d2 of the shape b is set to be smaller than the opening width d1 of the shape a (d1>d2).

Figure 3C:
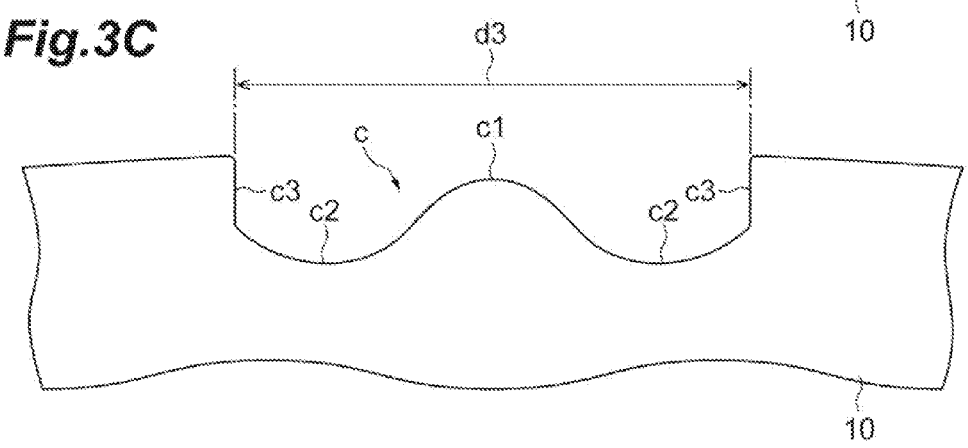

The shape c is a notch formed with a projecting portion c1, a pair of recessed portions c2, and a pair of linear portions c3, as shown in FIG. 3C. The projecting portion c1 has an arc shape protruding toward the side distant from the center axis A1 (radially outside of the blank member 10). A pair of recessed portions c2 have an arc shape depressed toward the center axis Ax and are positioned on both sides of the projecting portion c1. The inner ends of a pair of projecting portions c2 are coupled to the ends of the projecting portion c1. A pair of linear portions c3 both extend linearly along the radial direction of the blank member 10. One of the linear portions c3 couples the outer end of one of the recessed portions c2 with the outer peripheral edge of the blank member 10. The other linear portion c3 couples the outer end of the other recessed portion c2 with the outer peripheral edge of the blank member 10. The opening width d3 of the shape c is set to be smaller than the opening width d2 of the shape b (d2>d3).

In the blank member 10 shown in FIG. 2, the combinations of the signs 15A to 15F indicating the positions of the odd-shaped parts 15 with the signs a to c indicating the shapes of the odd-shaped parts 15 can represent the position and the shape of the odd-shaped parts. For example, in a blank member 10A illustrated in FIG. 4A, the odd-shaped parts 15A and 15B have the shape c, the odd-shaped parts 15C and 15D have the shape b, and the odd-shaped parts 15E and 15F have the shape a. Thus, the blank member 10A in FIG. 4A has odd-shaped parts 15Ac, 15Bc, 15Cb, 15Db, 15Ea, and 15Fa.

Similarly, a blank member 10B illustrated in FIG. 4B has odd-shaped parts 15Aa, 15Bc, 15Cc, 15Db, 15Eb, and 15Fa. A blank member 10C illustrated in FIG. 4C has odd-shaped parts 15Ab, 15Bc, 15Ca, 15Db, 15Ec, and 15Fa. A blank member 10D illustrated in FIG. 4D has odd-shaped parts 15Ac, 15Bb, 15Ca, 15Dc, 15Eb, and 15Fa.

A blank member 10E illustrated in FIG. 5A has odd-shaped parts 15Aa, 15Bc, 15Cb, 15Dc, 15Fb, and 15Fa. A blank member 10F illustrated in FIG. 58 has odd-shaped parts 15Ab, 15Bb, 15Cc, 15Da, 15Ea, and 15Fa. A blank member 106 illustrated in FIG. 5C has odd-shaped parts 15Ab, 15Bb, 15Cb, 15Da, 15Ea, and 15Fa. A blank member 10H illustrated in FIG. 5D has odd-shaped parts 15Aa, 15Ba, 15Ca, 15Db, 15Ea, and 15Fa.

The number of combinations of positions and shapes of the odd-shaped parts 15 can be found by a solution such as circular permutation or necklace permutation, depending on the presence/absence of the lug parts 14 and the presence/absence of the identification mark 6.

The laminated stator core 1 may be constructed by so-called rotational lamination. The "rotational lamination" refers to shifting the angles of the blank members 10 relative to each other when a plurality of blank members 10 are laminated to obtain the laminated stator core 1 and includes laminating while rotating the blank members 10. The rotational lamination is conducted mainly for the purpose of cancelling out the thickness deviation of the blank members 10. To obtain the laminated stator core 1, the blank members 10 may be rotationally laminated one by one, or rotational lamination may be performed in units of unit blocks 20 (see FIG. 6) each formed by laminating a predetermined number of blank members 10. The angle of rotational lamination may be set to any size as long as the lug parts 14 of the blank members 10 overlap each other. For example, since the blank member 10 has three tug parts 14 in this embodiment, the angle of rotational lamination may be set to 120°. When the unit blocks 20 are rotationally laminated, the number of unit blocks 20 to be laminated may be A times (where A is a natural number equal to or greater than 1) the number of lug parts 14 of the blank member 10. In this case, the flatness, the parallelism, and the perpendicularity of the obtained laminated stator core 1 can be improved.

FIG. 6 shows an example of the laminated stator core 1 produced by rotationally laminating the unit blocks 20 shifted by 120°, for example, where the unit block 20 is formed with the blank members 10A illustrated in FIG. 4A. Since the shapes a to c are different shapes (widths), the boundary between the unit blocks 20 can be easily recognized, as shown in FIG. 6. Accordingly, when the unit blocks 20 are joined together by welding, the boundary portion between the unit blocks 20 can be pinpointed to be welded. This can reduce the size of a welded part 21 for joining the unit blocks 20 together, thereby reducing the effect of the welded part 21 on the magnetic characteristics of the laminated stator core 1.

[Manufacturing Device for Laminated Stator Core]

Figure 7:
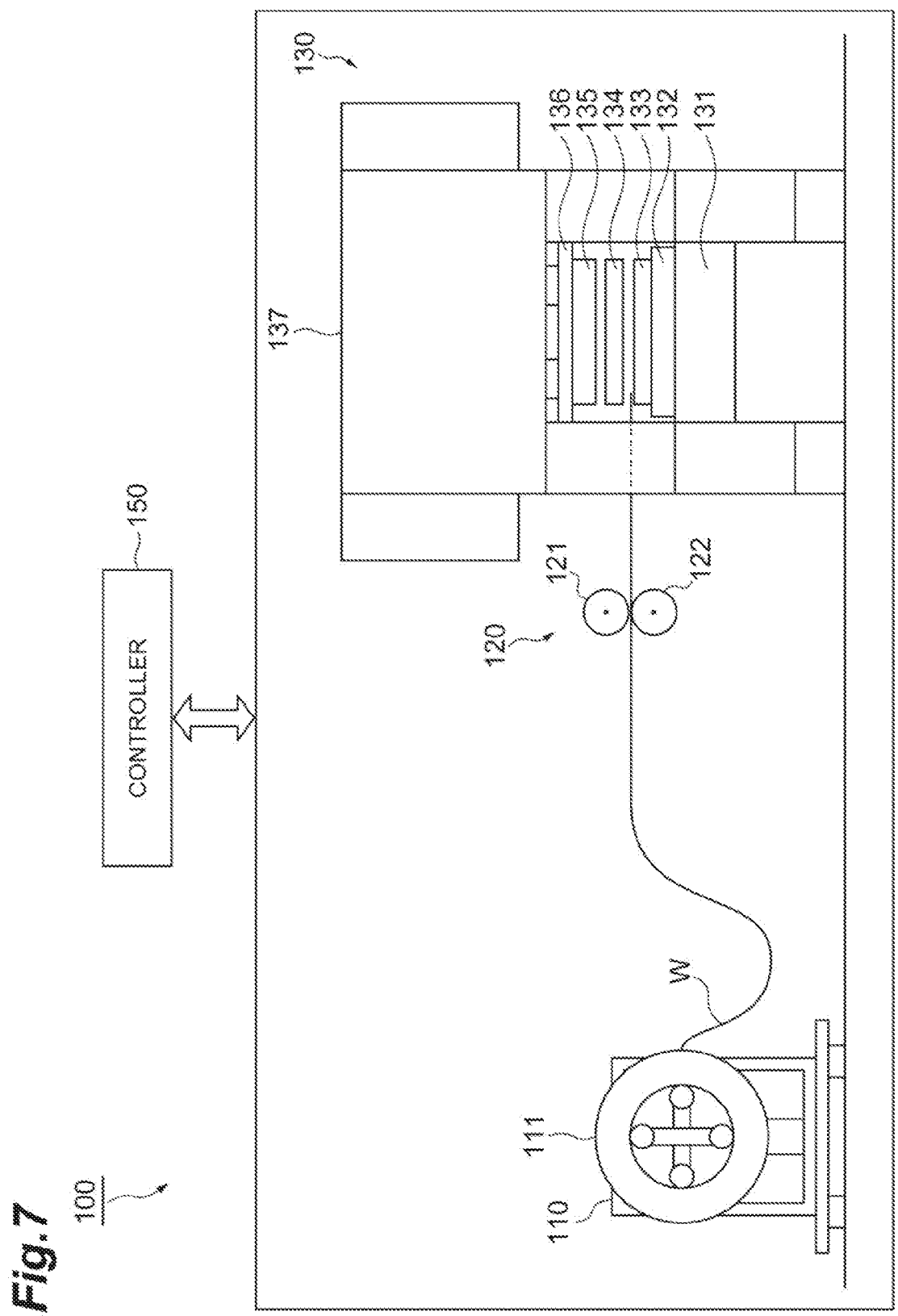
FIG. 7 is a schematic diagram showing an example of a manufacturing device for the laminated stator core.

Referring now to FIG. 7, a manufacturing device 100 for the laminated stator core 1 will be described. The manufacturing device 100 is a device for manufacturing a laminated stator core 1 from an electrical steel sheet W (workpiece plate which is a strip-shaped metal sheet. The manufacturing device 100 includes an uncoiler 110, a feeding device 120 (feeding unit), a blanking device 130, and a controller 150 (control unit).

The uncoiler 110 rotatably holds a coil material 111 in a state in which the coil material 111 is attached thereto, the coil material 111 being a strip-shaped electrical steel sheet V wound in the shape of a coil. The feeding device 120 has a pair of rollers 121 and 122 that pinch the electrical steel sheet W therebetween from above and below. A pair of rollers 121 and 122 rotate and stop based on an instruction signal from the controller 150 and progressively feed the electrical steel sheet W intermittently toward the blanking device 130.

The length of the electrical steel sheet W that forms the coil material 111 may be, for example, approximately 500 m to 10000 m. The thickness of the electrical steel sheet W may be, for example, approximately 0.1 mm to 0.5 mm. The thickness of the electrical steel sheet W may be, for example, approximately 0.1 mm to 0.3 mm in terms of obtaining a laminated stator core 1 having superior magnetic characteristics. The width of the electrical steel sheet W may be, for example, approximately 50 mm to 500 mm.

The controller 150 generates an instruction signal for operating the feeding device 120 and the blanking device 130, for example, based on a program recorded on a recording medium (not shown) or an operation input by the operator and transmits the generated instruction signal to the feeding device 120 and the blanking device 130.

[Blanking Device]

Figure 8:
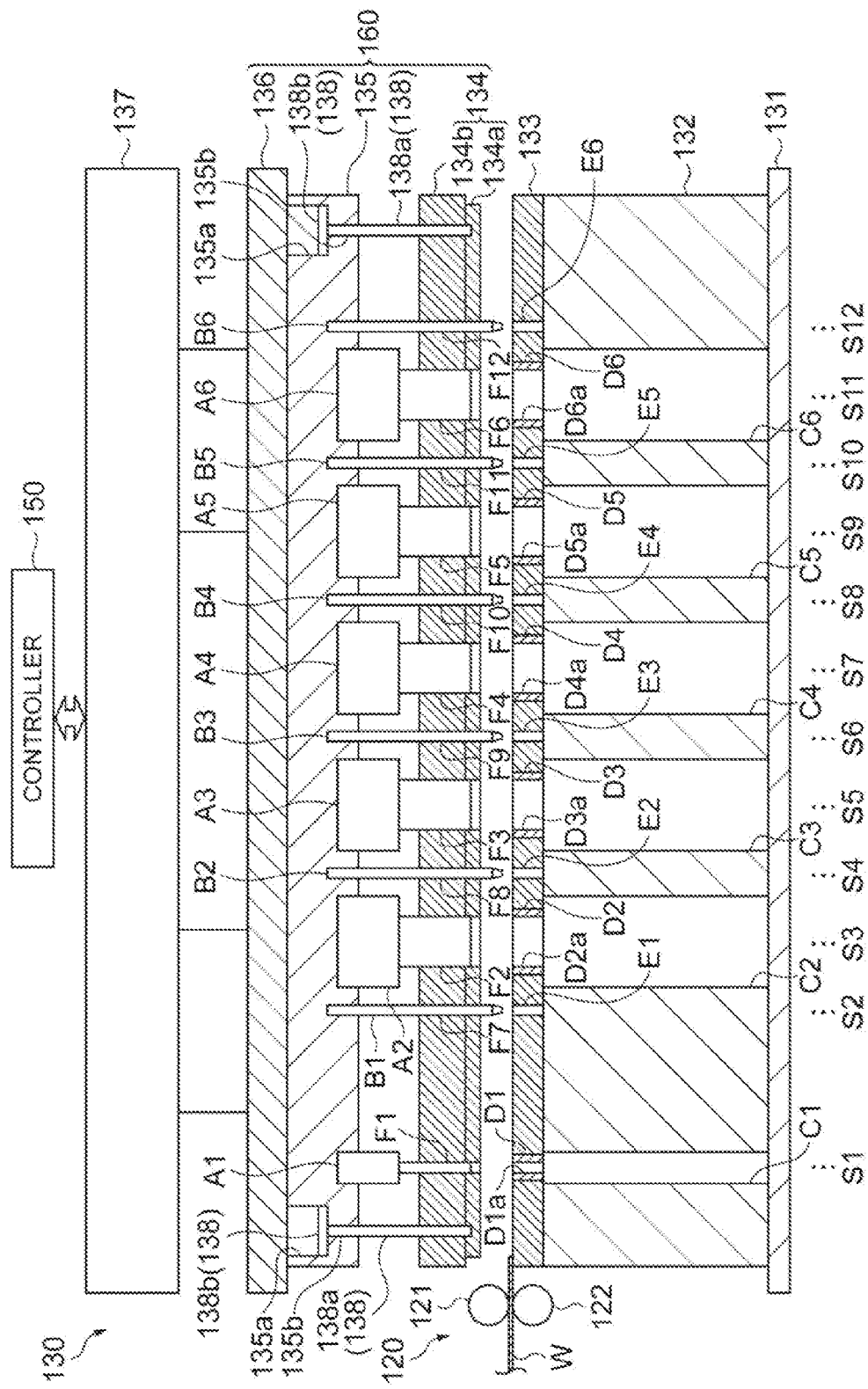
FIG. 8 is a schematic diagram showing an example of a blanking device.
Figure 9:
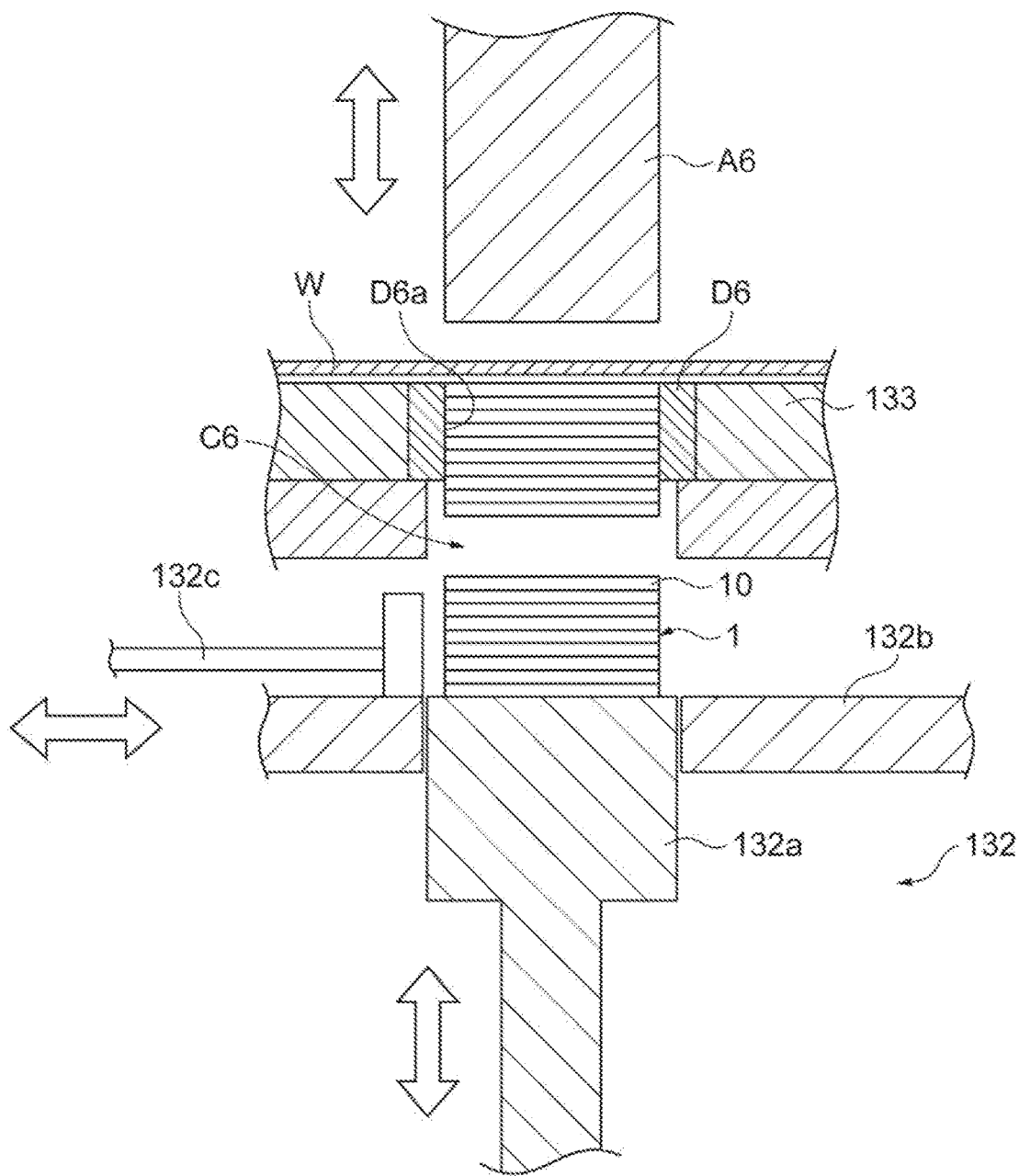
FIG. 9 is a cross-sectional view schematically showing a mechanism for laminating the blank members and a mechanism for ejecting the laminated stator core from the die plate.

Referring now to FIG. 7 to FIG. 9, the blanking device 130 will be described. The blanking device 130 has the function of successively blanking the electrical steel sheet W intermittently fed by the feeding device 120 to form blank: members 10 and the function of successively superposing and laminating the blank members 10 obtained through blanking to manufacture a laminated stator core 1.

As shown in FIG. 7 and FIG. 8, the blanking device 130 has a base 131, a lower die 132, a die plate 133, a stripper 134, an upper die 135, a top plate 136, a press machine 137 (drive unit), a suspension tool 138, punches A1 to A6, and retainer pins B1 to B6. The base 131 supports the lower die 132 placed on the base 131.

The lower die 132 holds the die plate 133 placed on the lower die 131 in the lower die 132, ejection holes C1 to C6 are provided at positions corresponding to the punches A1 to A6 to eject the material cut out from the electrical steel sheet W (for example, the blank member 10 and scraps). Inside the ejection hole C6, as shown in FIG. 9, a cylinder 132a, a stage 132b, and a pusher 132c are disposed.

The cylinder 132a supports the blank member 10 to prevent the blank member 10 cut out from the electrical steel sheet W with the punch A6 from dropping downward. The cylinder 132a is configured to be movable in the up/dorm direction based on an instruction signal from the controller 150. Specifically, the cylinder 132a intermittently moves downward every time the blank member 10 is stacked on the cylinder 132a. When a predetermined number of blank members 10 are laminated together on the cylinder 132a to form a laminated stator core 1, the cylinder 132a moves to a position where the front surface of the cylinder 132a is flush with the front surface of the stage 132b.

The stage 132b has a hole to allow the cylinder 132a to pass through. The pusher 132c is configured to be movable horizontally on the front surface of the stage 132b, based on an instruction signal from the controller 150. In a state in which the cylinder 132a moves to position where the front surface of the cylinder 132a is flush with the front surface of the stage 132b, the pusher 132c pushes out the laminated stator core 1 from the cylinder 132a to the stage 132b. The laminated stator core 1 pushed out to the stage 132b is conveyed to the outside of the manufacturing device 100.

Returning to FIG. 8, the die plate 133 has the function of shaping the blank member 10 together with the punches A1 to A6. The die plate 133 has dies D1 to D0 at positions corresponding to the punches A1 to A6. The dies D1 to D6 have through holes D1a to D6a (die holes) extending in the up/down direction and communicatively connecting with the corresponding ejection holes C1 to C6. The diameters of the through holes D1a to D6a each have a size that allows insertion of the tip end portions of the punches A1 to A6 and is slightly smaller than the tip end portions. The die plate 133 has insertion holes E1 to E6 at positions corresponding to retainer pins B1 to B6.

The stripper 134 has a stripper plate 134a and a holding plate 134b. The stripper plate 134a has the function of removing the electrical steel sheet W biting into the punches A1 to A0 from the punches A1 to A6 when the electrical steel sheet W is blanked with the punches A1 to A6. The stripper plate 134a is positioned above the die plate 133. The holding plate 134b holds the stripper plate 134a from above.

The stripper 134 has through holes F1 to F6 at positions corresponding to the punches A1 to A6. The through boles F1 to F6 each extend in the up/down direction and communicatively connect with the through holes D1a to D6a in the corresponding dies D1 to D6 when the stripper plate 134a comes into contact with the die plate 133. The lower portions of the punches A1 to A6 are inserted into the through holes F1 to F6, respectively. The lower portions of the punches A1 to A6 can be slid in the through holes F1 to F6, respectively.

The stripper 134 has through holes F7 to F12 at the positions corresponding to the retainer pins B1 to B6. The through holes F7 to F12 each extend in the up/down direction and communicatively connect with the corresponding insertion holes E1 to E6 when the stripper plate 134a comes into contact with the die plate 133. The lower portions of the retainer pins B1 to B6 are inserted in the through holes F7 to F12, respectively. The lower portions of the retainer pins B1 to B6 can be slid in the through holes F7 to F12, respectively.

The upper die 135 is positioned above the stripper 134. The base portions (upper portions) of the punches A1 to A6 and the retainer pins B1 to B6 are fixed to the upper die 135. The upper die 135 thus holds the punches A1 to A6 and the retainer pins B1 to B6. In the upper die 135, an accommodating space 135a and a through hole 135b are provided at each of the ends on the upstream side and the downstream side of the blanking device 130. The accommodating space 135a is positioned on the top plate 136 side and extends in the up/down direction. The through hole 135b passes through downward from the accommodating space 135a.

The top plate 136 is positioned above the upper die 135. The top plate 136 holds the upper die 135. The press machine 137 is positioned above the top plate 136. The piston of the press machine 137 is connected to the top plate 136 and operates based on an instruction signal from the controller 150. When the press machine 137 operates, the piston is extended and compressed to move the stripper 134, the upper die 135, the top plate 136 the suspension tool 138, the punches A1 to A6, and the retainer pins B1 to B6 (hereinafter they will be referred to as movable, unit 160) up and down as a whole.

The suspension tool 138 holds the stripper 134 suspended from the upper die 135. The suspension tool 138 has an elongated rod part 138a and a head part 138b provided at the upper end of the rod part 138a. The lower end portion of the rod part 138a is fixed to the stripper 134. The upper end portion of the rod part 138a is inserted in the through hole 135b in the upper die 135. The head part 138b has a diameter larger than the lower end portion and is accommodated in the accommodating space 135a in the upper die 135. The head part 138b thus can move up and down in the accommodating space 135a relative to the upper die 135.

The punches A1 to A6 have the function of blanking the electrical steel sheet W into a predetermined shape together with the die plate 133 (dies D1 to D6). The punches A1 to A6 are disposed in a line in this order from the upstream side (the feeding device 120 side) toward the downstream side of the blanking device 130. In the width direction of the electrical steel sheet W (hereinafter simply referred to as "width direction"), a plurality of punches A1 are arranged in a row. In the width direction, a plurality of punches A2 are arranged in a row, in the width direction, a plurality of punches A3 are arranged in a row. In the width direction, a plurality of punches A4 are arranged in a row. In the width direction, a plurality of punches A5 are arranged in a row. In the width direction, a plurality of punches A6 are arranged in a row.

All of the tip end shapes of the punches A1 are approximately the same. That is, all of the blank shapes of the electrical steel sheet W with the punches A1 are the same. All of the tip end shapes of a plurality of punches A2 are approximately the same. That is, all of the blank shapes of the electrical steel sheet W with the punches A2 are approximately the same. The tip end shapes of the punches A3 are different from each other. That is, the blank shapes of the electrical steel sheet W with the punches A3 do not agree with each other.

All of the tip end shapes of the punches A4 are approximately the same. That is, all of the blank shapes of the electrical steel sheet W with the punches A4 are approximately the same. All of the tip end shapes of the punches A5 are approximately the same. That of the blank shapes of the electrical steel sheet W with the punches A5 are approximately the same. All of the tip end shapes of the punches A6 are approximately the same. That is, all of the blank shapes of the electrical steel sheet W with the punches A6 are approximately the same.

The retainer pins B1 to B6 have the function of pressing the electrical steel sheet W against the die plate 133 when the electrical steel sheet W is blanked with the punches A1 to A6. The retainer pins B1 to B6 are disposed so as to be arranged in this order from the upstream side (the feeding device 120 side) toward the downstream side of the blanking device 130.

[Method of Manufacturing Laminated Stator Core]

Referring now to FIG. 7 to FIG. 10, a method of manufacturing a laminated stator core 1 will be described. First of all, the electrical steel sheet W is fed by the feeding device 120 to the blanking device 130, and when a portion to be worked in the electrical steel sheet W reaches the punch A1, the controller 150 gives an instruction to the press machine 137 so that the press machine 137 pushes the movable unit 160 downward toward the die plate 133. After the stripper 134 reaches the die plate 133 and the electrical steel sheet W is held between the stripper 134 and the die plate 133, the controller 150 also gives an instruction to the press machine 137 so that the press machine 137 pushes the movable unit 160 downward.

At this point of time, the stripper 134 does not move but the tip end portions of the punches A1 to A6 and the retainer pins B1 to 136 move in the through holes F1 to F12 in the stripper plate 104 to reach the corresponding through holes D1a to D6a and the insertion holes E1 to E6 in the die plate 133. The electrical steel sheet W is then blanked along a predetermined blank shape with the punches A1, and a pair of through holes W1 are formed in the vicinity of both edges of the electrical steel sheet W (see the position S1 in FIG. 8 and FIG. 10). That is, a pair of through holes W1 are arranged in a row in the width direction. The blanked scraps are ejected from the ejection hole C1 the lower die 132. Subsequently, the press machine 137 operates to elevate the movable unit 160.

Next, the electrical steel sheet W is fed by the feeding device 120, and when a portion to be worked in the electrical steel sheet W reaches the punch A2, the controller 150 gives an instruction to the press machine 137 so that the press machine 137 elevates and lowers the movable unit 160. Thus, the electrical steel sheet W is blanked along a predetermined blank shape with a plurality of punches A2 arranged in a row in the width direction, and a plurality of blank parts W2 are formed in the electrical steel sheet W (see the position S3 in FIG. 8 and FIG. 10). That is, a plurality of blank parts W2 are arranged in a row in the width direction.

Figure 10:
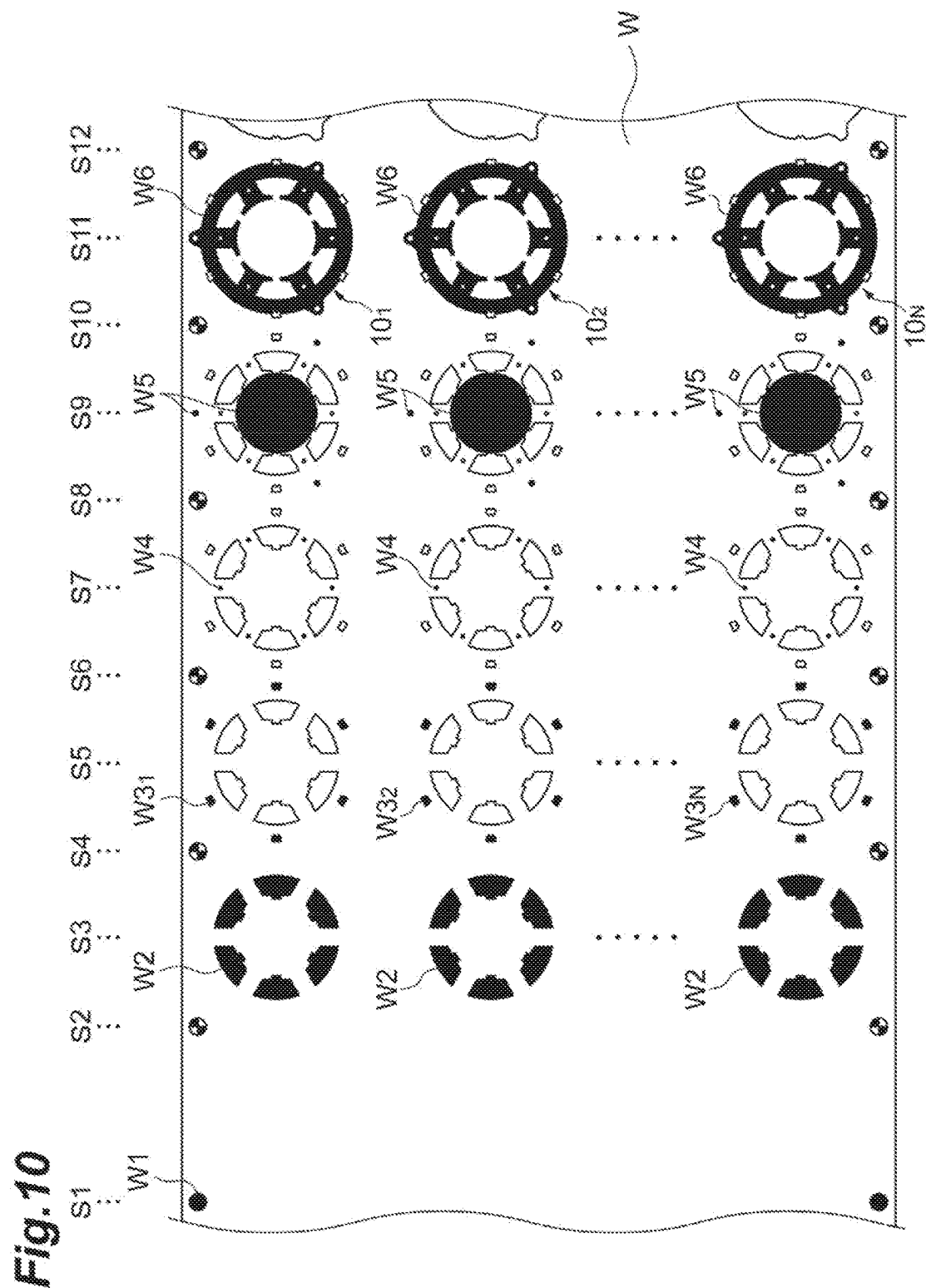
FIG. 10 is a diagram showing an example of the layout of blanking.

Each blank part W2 is configured with six throughholes arranged in a circular shape in FIG. 10. Each through hole corresponds to the slot 10b of the blank member 10. The blanked scraps are ejected from the ejection hole C2 in the lower die 132. In blanking the electrical steel sheet W with the punches A2, the retainer pins B1 and 132 are inserted in the through holes W1 and the insertion holes E1 and E2 (see the positions S2 and S4 in FIG. 8 and FIG. 10).

Next, the electrical steel sheet W is fed by the feeding device 120, and when a portion to be worked in the electrical steel sheet W reaches the punch A3, the controller 150 gives an instruction to the press machine 137 so that the press machine 137 elevates and lowers the movable unit 160.

Thus, the electrical steel sheet W is blanked along a predetermined blank shape with a plurality of punches A3 arranged in a row in the width direction, and a plurality of blank parts $W3_1$ to $W3_N$ (N is a natural number equal to or greater than 2) are formed in the electrical steel sheet W (see the position S5 in FIG. 8 and FIG. 10). That is, a plurality of blank parts $W3_1$ to $W3_N$ are arranged in a row in the width direction.

Each of the blank parts $W3_1$ to $W3_N$ is configured with six through holes arranged in a circular shape in FIG. 10. The inner peripheral edge of each through hole corresponds to the odd-shaped part 15 of the blank member 10. Here, since the tip end shapes of a plurality of punches A3 arranged in a row in the width direction are different from each other, the blank shapes (the shapes of the inner peripheral edges of the through holes) of the blank parts $W3_1$ to $W3_N$ do not agree with each other. The blanked scraps are ejected from the ejection hole C3 in the lower die 132. In blanking the electrical steel sheet W with the punches A3, the retainer pins B2 and B3 are inserted in the through holes W1 and the insertion holes E2 and E3 (see the positions S4 and S6 in FIG. 8 and FIG. 10).

Next, the electrical steel sheet W is fed by the feeding device 120, and when a portion to be worked in the electrical steel sheet W reaches the punch A4, the controller 150 gives an instruction to the press machine 137 so that the press machine 137 elevates and lowers the movable unit 160. Thus, the electrical steel sheet W is blanked or half-blanked along a predetermined blank shape with a plurality of punches A4 arranged in a row in the width direction, and a plurality of worked portions W4 are formed in the electrical steel sheet W (see the position S7 in FIG. 8 and FIG. 10). That is, a plurality of worked portions W4 are arranged in a row in the width direction.

Each worked portion W4 is configured with six through holes or projecting and recessed portions arranged in a circular shape, in FIG. 10. Each through hole corresponds to the through hole of the swaged area 7. Each projecting and recessed portion corresponds to the swaged area of the swaged area 7. When each worked portion W4 is a through hole, the blanked scraps are ejected from the ejection hole C4 in the lower die 132. In working the electrical steel sheet W with the punches A4, the retainer pins B3 and B4 are inserted in the through holes W1 and the insertion holes E3 and E4 (see the positions S6 and S8 in FIG. 8 and FIG. 10).

Next, the electrical steel sheet W is fed by the feeding device 120, and when a portion to be worked in the electrical steel sheet W reaches the punch A5, the controller 150 gives an instruction to the press machine 137 so that the press machine 137 elevates and lowers the movable unit 160. Thus, the electrical steel sheet W is blanked with a plurality of punches A5 arranged in a row in the width direction, and a plurality of blank parts W5 are formed in the electrical steel sheet W (see the position S9 in FIG. 8 and FIG. 10). That is, a plurality of blank parts W5 are arranged in a row in the width direction.

Each blank part W5 is configured with one through hole at the center surrounded by the blank part W2 and three through holes arranged in a circular shape on the outside of the blank part W2 in FIG. 10. One through hole at the center corresponds to the through hole 10a of the blank member 10. Three through holes on the outer periphery correspond to the through holes 14a of the blank member 10. The blanked scraps are ejected from the ejection hole C5 in the lower die 132. In blanking the electrical steel sheet W with the punches A5, the retainer pins B4 and B5 are inserted in the through holes W1 and the insertion holes E4 and E5 (see the positions S8 and S10 in FIG. 8 and FIG. 10).

Next, the electrical steel sheet W is fed by the feeding device 120, and when a portion to be worked in the electrical steel sheet W reaches the punch A6, the controller 150 gives an instruction to the press machine 137 so that the press machine 137 elevates and lowers the movable unit 160. Thus, the electrical steel sheet W is blanked along a predetermined blank shape with a plurality of punches A6 arranged in a row in the width direction, and a plurality of blank parts W6 are formed in the electrical steel sheet W (see the position in FIG. 8 and FIG. 10). That is, a plurality of blank parts W6 are arranged in a row in the width direction. In other words, the blank parts W6 are positioned at the $1^{st}$ to $N^{th}$ positions arranged in a row in the width direction.

Each blank part W6 has a ring shape corresponding to the shape of the outer peripheral edge excluding the acid-shaped part 15 of the blank member 10 in FIG. 10. Thus, a plurality of blank members $10_1$ to $10_N$ are formed in the width direction (see the position S11 in FIG. 8 and FIG. 10). In blanking the electrical steel sheet W with the punches A6, the retainer pins B5 and B6 are inserted in the through holes W1 and the insertion holes E5 and E6 (see the positions S10 and S12 in FIG. 8 and FIG. 10). Each of the blank members $10_1$ to $10_N$ is thus placed respectively on the corresponding cylinder 132a in the ejection bole C6, and then each of the blank members $10_1$ to $10_N$ is respectively jointed together and laminated. The process described above is repeated to form the laminated stator core 1. The identification mark 6 may be formed with a laser marker or the like after the blank member 10 is ejected from the die (the lower die 132 and the upper die 135) to reach the ejection hole C6.

Here, since the blank shapes of the blank parts $W3_1$ to $W3_N$ do not agree with each other, the shapes of the blank members $10_1$ to $10_N$ do not agree with each other, either. For example, when N=2, the blank member 10A illustrated in FIG. 4A may be formed as the blank member $10_1$, and the blank member 10B illustrated in FIG. 4B may be formed as the blank member $10_2$. Here, the blank member $10_1$ and the blank member $10_2$ have different shapes c and a of the odd-shaped part 15A, different shapes b and c of the odd-shaped part 15C, and different shapes a and h of the odd-shaped part 15E. Accordingly, the shape or arrangement of at least one odd-shaped part 15 of a plurality of odd-shaped parts 15 in the blank member $10_1$ is different from the shape or arrangement of at least one odd-shaped part 15 of a plurality of odd-shaped parts 15 in the blank member $10_2$.

[Effects]

By the way, the method described in Japanese unexamined Patent Publication No. 2013-013189 requires a punch and a die for forming the identification mark. This increases the number of punches and dies and may complicate the structure of the device for producing laminated cores.

However, in the present embodiment as described above, the blank members $10_1$ to $10_N$, cut out from the electrical steel sheet W each have a plurality of odd-shaped parts 15 at a position overlapping, each other during lamination. In the present embodiment, the shape or arrangement of at least one odd-shaped part of a plurality of odd-shaped parts 15 in the blank member $10_k$ (k is a natural number of 1 to N) differs from the shape or arrangement of at least one odd-shaped part of a plurality of odd-shaped parts 15 in the blank member $10_m$ (m is a natural number of 1 to N and satisfying m≠k) such that the shape of the blank member $10_k$ and the shape of the blank member $10_m$ do not agree with each other. Thus, since the shapes of the blank members $10_1$ to $10_N$ cut out at the $1^{st}$ to $N^{th}$ positions in the width direction in the electrical steel sheet W are different from each other, it is possible to specify at which position of the $1^{st}$ to $N^{th}$ positions a given blank member 10 is cut out.

In the present embodiment, for convenience of manufacturing the laminated stator core 1, a plurality of odd-shaped parts 15 are formed in the blank member 10. The shape of the blank member $10_k$ and the shape of the blank member $10_m$ are distinguished from each other by the shape or arrangement of the odd-shaped parts 15. This enables identification of different blank members 10 from each other using existing punches, dies, and the like for forming odd-shaped parts 15 and thus eliminates the need for installing new punches, dies, and the like for identifying blank members 10. With the configuration described above, when a plurality of blank members $10_1$ to $10_N$ are cut out from the electrical steel sheet W in the width direction, it is possible to specify at which position in the width direction of the electrical steel sheet W the respective blank members 10 are cut out, while complication of the device is suppressed.

In the present embodiment, the odd-shaped part 15 has three functions in combination, namely, the function for identifying the blanking position of the blank member 10, the function serving as the welded part 21 for joining the blank members 10 together by welding, and the function serving as a rotational lamination identifying part for identifying the boundary of rotational lamination. This eliminates the need for individually providing a member or a shape for fulfilling these functions in the blank member 10.

In the present embodiment, the identification mark 6 for identifying the front and the back of the blank member 10 is formed on the blank member 10. Therefore, even if the shapes of two different blank members 10 agree with each other when front and back are reversed, it is possible to specify at which position in the electrical steel sheet W these blank members 10 are cut out. Accordingly, it is possible to increase the number of patterns of shapes of blank members 10 without overlap, using the identification mark 6 in addition to the kinds of shapes of the odd-shaped parts 15.

Other Embodiments

Although the embodiment according to the present disclosure has been described in details above, various modifications may be added to the foregoing embodiment within the spirit of the present invention. For example, the identification mark 6 may not be provided on the blank member 10

The blank member 10 may have a ring shape other than an annular shape. The blank member 10 may not have a ring shape. That is, the blank member 10 may be a piece of metal that forms a ring shape when a plurality of blank members 10 are combined and that constitutes a split laminated core.

In order to fasten a plurality of blank members 10, a variety of known methods may be employed in addition to the swaged area 7 or instead of the swaged area 7. For example, a plurality of blank members 10 may be fastened by joining using adhesive or resin material, by welding, or the like. Among those, a plurality of blank members 10 may be fastened by swaging or welding in terms of low costs and work efficiency. On the other hand, a plurality of blank members 10 may be fastened by joining using adhesive or resin material in terms of development of high torque and low iron loss in the motor. Alternatively, the laminated stator core 1 may be obtained by providing the blank member 10 with a temporary inter-locking plate (not shown) having a temporary inter-locking part, fastening a plurality of blank members 10 through the temporary inter-locking parts of the temporary inter-locking plates to obtain an intermediate product, and thereafter removing the temporary inter-locking block formed with the laminated temporary inter-locking plates from the intermediate product. The "temporary inter-locking part" means a swaged area used for temporarily integrating a plurality of blank members 10 together.

Figure 11:
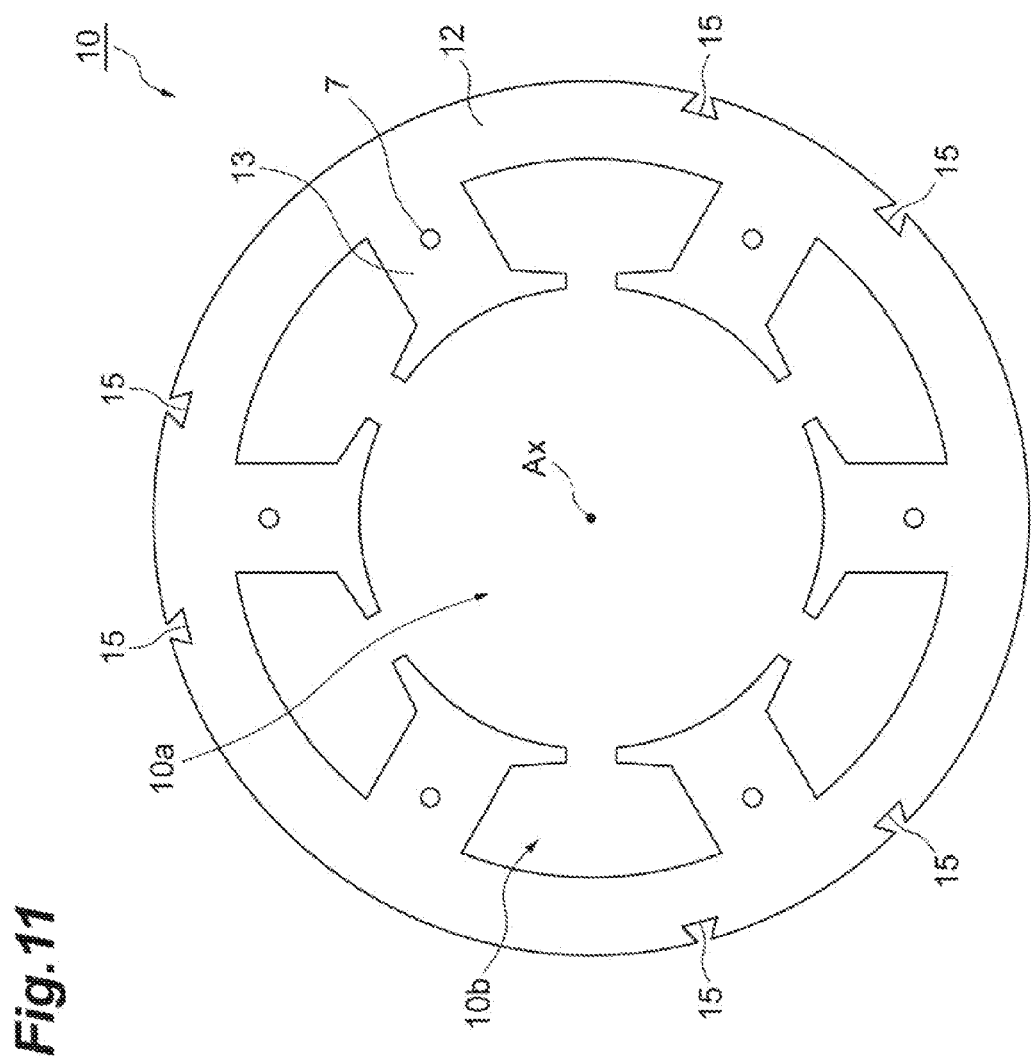
FIG. 11 is a top view showing another example or the blank member of the laminated stator core.

The odd-shaped part 15 may have other functions for convenience of manufacturing the laminated stator core 1, in addition to the function for identifying the blanking position of the blank member 10. For example, as shown in FIG. 11, the odd-shaped part 15 may be a notch configured to allow the blank member 10 to be engaged with a protrusion of the die D6. In this case, when the blank member 10 is cut out from the electrical steel sheet W with the punch A6, the odd-shaped part 15 formed on the outer peripheral edge of the blank member 10 (yoke part 12) is fitted to the protrusion of the die D6 to suppress that the blank member 10 comes out from the die D6 along with the punch A6 when the punch A6 is pulled out from the die D6. That is, in the manner in FIG. 11, the odd-shaped part 15 has the function for identifying the blanking position of the blank member 10 and the function serving as a fitting part for allowing the blank member 10 to be fitted to the die D6, in combination.

The odd-shaped part 15 may have any shape and may be shaped to be recessed, projecting, or projecting and recessed.

The odd-shaped part 15 may be formed at the lug part 14 of the blank member 10. That is, the odd-shaped part 5 may be formed at the lug part 4 of the laminated stator core 1. In this case, a protrusion, a notch, or a projecting and recessed portion is provided at the lug part 14 (lug part 4). Also in this case, the odd-shaped part 15 may have three functions in combination, namely, the function for identifying the blanking position of the blank member 10, the function serving as the welded part 21 for joining the blank members 10 together by welding, and the function serving as a rotational lamination identifying part for identifying the boundary of rotational lamination.

The swaged area may be used as the odd-shaped part 15. For example, the shape or arrangement of the swaged areas in the blank member $10_k$ may be different from the shape or arrangement or swaged areas in the blank member 10.

Figure 12:
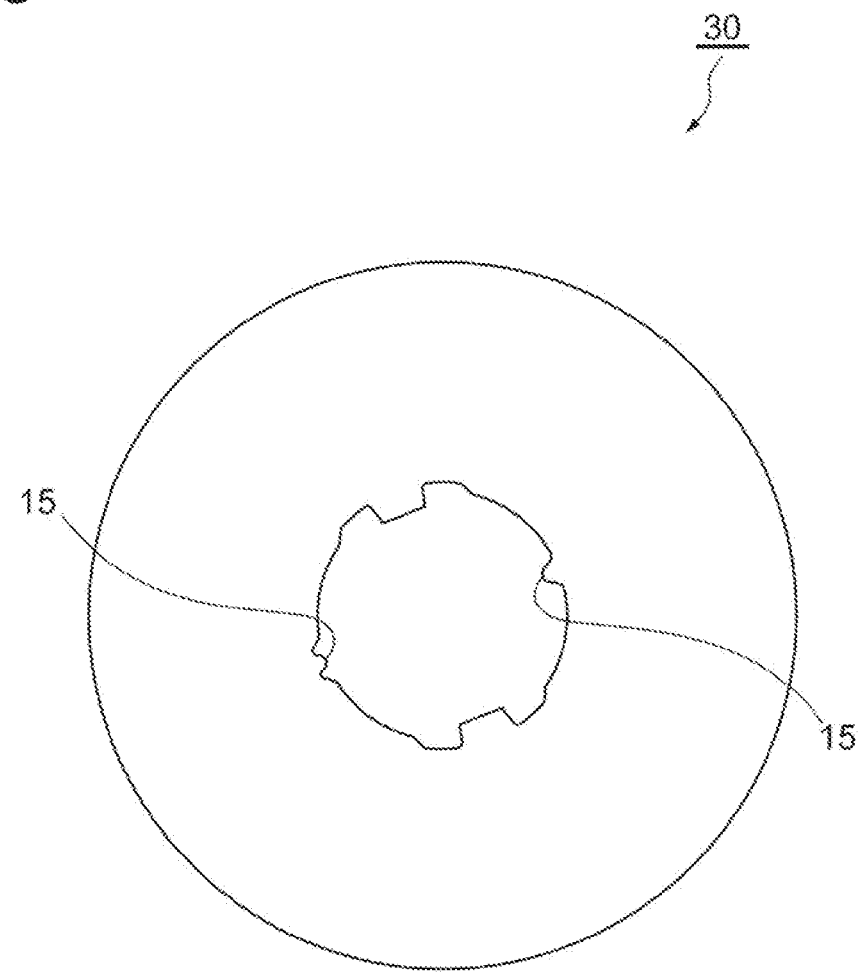
FIG. 12 is a top view showing an example of the blank member of the laminated rotor core.

As shown in FIG. 12, the present invention may be applied to a blank member 30 of a laminated rotor core. In the manner shown in FIG. 12, a plurality of odd-shaped parts 15 (two odd-shaped parts 15 in FIG. 12) are formed on the inner peripheral edge of the blank member 30. One of the odd-shaped parts 15 is a projecting portion protruding toward the center of the blank member 30. The other odd-shaped part 15 has two recessed portions depressed toward the outer peripheral edge of the blank member 30. The boundary portion of rotational lamination can be identified by these two odd-shaped parts 15 having different shapes. That is, in the manner in FIG. 12, the odd-shaped part 15 has the function for identifying the blanking position of the blank member 10 and the function serving as a rotational lamination identifying part for identifying the boundary of rotational lamination, in combination.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A method of manufacturing a laminated core, comprising:

blanking a strip-shaped metal sheet along predetermined $1^{st}$ to $N^{th}$, wherein N is a natural number equal to or greater than 2, blank shapes at $1^{st}$ to $N^{th}$ positions arranged in a width direction of the metal sheet to form $1^{st}$ to $N^{th}$ blank members, arranged in $1^{st}$ to $N^{th}$ blank rows, corresponding to the $1^{st}$ to $N^{th}$ blank shapes, respectively, wherein a plurality of punches are arranged in the $1^{st}$ to $N^{th}$ rows, which corresponds to the $1^{st}$ to $N^{th}$ positions, to form the $1^{st}$ to $N^{th}$ blank members arranged in the $1^{st}$ to $N^{th}$ rows in the width direction; and laminating the blank members of each of $1^{st}$ to $N^{th}$ blank rows to form a laminate for the each of the $1^{st}$ to $N^{th}$ blank rows, wherein the $1^{st}$ to $N^{th}$ blank members each have a plurality of odd-shaped parts having at least one of a recessed shape and a projecting shape at a position overlapping each other when the blank members are laminated in the step of laminating, and at least one of shape and arrangement of at least one odd-shaped part of the odd-shaped parts in the $k^{th}$, wherein k is a natural number of 1 to N, blank member differs from at least one of shape and arrangement of at least one odd-shaped part of the odd-shaped parts in the $m^{th}$, wherein m is a natural number of 1 to N and satisfying m is not k, blank member such that a shape of the $k^{th}$ blank member and a shape of the $m^{th}$ blank member do not agree with each other.

2. The method according to claim 1, wherein the odd-shaped part is formed at each of peripheral edges of the $1^{st}$ to $N^{th}$ blank members and is any one of a welded part to be used for welding the blank members together, a fitting part configured to be fitted to a die during blanking of the blank member from the metal sheet, and a rotational lamination identifying part to be used for identifying rotational lamination.

3. The method according to claim 2, wherein the blank member has a ring shape.

4. The method according to claim 3, wherein in the step of laminating, the blank members or blocks each formed by laminating a predetermined number of the blank members are rotationally laminated to form the laminate.

5. The method according to claim 4, wherein in the step of blanking, an identification mark to be used for identifying the front and back of the blank member is formed.

6. The method according to claim 3, wherein in the step of blanking, an identification mark to be used for identifying the front and back of the blank member is formed.

7. The method according to claim 2, wherein in the step of laminating, the blank members or blocks each formed by laminating a predetermined number of the blank members are rotationally laminated to form the laminate.

8. The method according to claim 7, wherein in the step of blanking, an identification mark to be used for identifying the front and back of the blank member is formed.

9. The method according to claim 2, wherein in the step of blanking, an identification mark to be used for identifying the front and back of the blank member is formed.

10. The method according to claim 1, wherein the blank member has a ring shape.

11. The method according to claim 10, wherein in the step of laminating, the blank members or blocks each formed by laminating a predetermined number of the blank members are rotationally laminated to form the laminate.

12. The method according to claim 11, wherein in the step of blanking, an identification mark to be used for identifying the front and back of the blank member is formed.

13. The method according to claim 10, wherein in the step of blanking, an identification mark to be used for identifying the front and back of the blank member is formed.

14. The method according to claim 1, wherein in the step of laminating, the blank members or blocks each formed by laminating a predetermined number of the blank members are rotationally laminated to form the laminate.

15. The method according to claim 14, wherein in the step of blanking, an identification mark to be used for identifying the front and back of the blank member is formed.

16. The method according to claim 1, wherein in the step of blanking, an identification mark to be used for identifying the front and back of the blank member is formed.

* * * * *